April 19, 1955
S. F. BIRCH ET AL
2,706,736
PRODUCTION AND SEPARATION OF SULPHONATED
ORGANIC COMPOUNDS
Filed Jan. 26, 1950
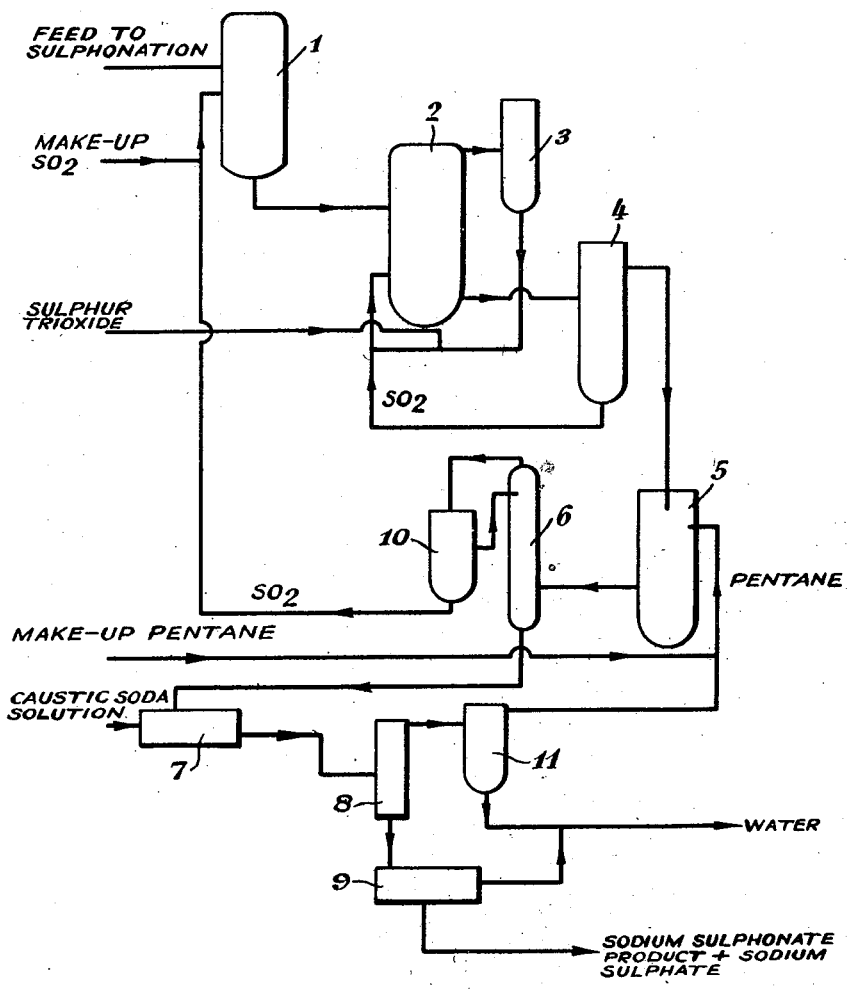
Inventors:
Stanley Francis Birch
Wilfred Samuel Nathan
By: Morgan, Finnegan and Durham
Attorneys.

United States Patent Office 2,706,736
Patented Apr. 19, 1955

2,706,736

PRODUCTION AND SEPARATION OF SULPHONATED ORGANIC COMPOUNDS

Stanley Francis Birch and Wilfred Samuel Nathan, Sunbury-on-Thames, England, assignors to The British Petroleum Company Limited Application January 26, 1950, Serial No. 140,588

Claims priority, application Great Britain February 19, 1949

9 Claims. (Cl. 260—505)

The invention relates to an improved process for the separation of sulphonated organic compounds from the sulphonation reaction product.

The sulphonation of aromatic compounds by oleum and sulphur trioxide is frequently accompanied by undesirable side reactions. The products of these side reactions are often of unpleasant odour and their presence materially reduces the value of the primary products for many purposes.

The occurrence of these undesirable side reactions is avoided to a marked extent by the use of liquid sulphur dioxide as a reaction diluent since this solvent permits accurate control of reaction temperature. This process is described in detail in the specification accompanying the co-pending patent application No. 21,847/48. Usually the sulphonic acid produced is converted to an alkali metal sulphonate. It is desirable that the sulphur dioxide be removed from the crude product prior to neutralisation to avoid the formation of non-volatile sulphites, and to enable the recycling of sulphur dioxide to the reaction zone to be effected without complication due to the presence of large amounts of water.

It has been found that during the removal of sulphur dioxide from the product by distillation there is a darkening in the colour of the product and malodourous impurities are formed. This disadvantage may be overcome to some extent by operating the distillation stage under reduced pressure, but this measure alone has not proved satisfactory.

According to the present invention the sulphonic acid obtained by reacting an aromatic compound with oleum or sulphur trioxide, in the presence of liquid sulphur dioxide as solvent, is recovered from solution in liquid sulphur dioxide by a process which comprises adding to the solution, before or during distillation, a volatile organic compound, chemically inert under the distillation conditions, and which is a mobile liquid at $-10°$ C., and distilling the mixture to take overhead substantially all of the liquid sulphur dioxide and some or all of the added organic compound.

It is not always necessary nor, in fact desirable, to treat the whole of the sulphonation product according to the process of the invention.

Usually the crude sulphonation product forms two layers on standing. The upper layer containing the bulk of the sulphonic acid may be treated according to the process of the invention, and the lower layer, consisting mainly of liquid sulphur dioxide with small quantities of sulphonic acid dissolved therein, recycled to the sulphonation reaction.

Preferably the distillation is carried out under reduced pressure. The preferred pressure range is 10 to 760 mm. of mercury.

More particularly, it is preferred that the pressure of distillation be adjusted to maintain the distillation temperature at or below 0° C.

Preferably the added organic compound is of low solubility in sulphur dioxide since subsequent separation of these components of the overhead may then be effected by settling or centrifuging.

According to one manner of operation the organic compound is added to the liquid feed to the distillation zone. Solvents suitable for operation in this manner include paraffins of at least four and preferably 4–8 carbon atoms/molecule, naphthenes of 5–8 carbon atoms/molecule, for example methylcyclohexane, aromatic hydrocarbons, for example toluene, aliphatic ethers, preferably having not more than four carbon atoms/molecule such as dimethyl ether, diethyl ether and methyl propyl ether and cyclic ethers and halogenated hydrocarbons, such as chloroform, ethylene dichloride, carbon tetrachloride and methylene dichloride.

Preferably the added organic compound is capable of forming a minimum constant boiling mixture with sulphur dioxide at atmospheric or lower pressures.

In batch operation according to preferred procedure, the solution of sulphonic acid in liquid sulphur dioxide is diluted with 2–3 times its volume of the volatile organic compound and the mixture distilled at a still pot temperature below 0° C.

In continuous operation according to preferred procedure the solution of sulphonic acid in liquid sulphur dioxide is fed to a column in which the volatile organic compond is refluxed. The overhead product is settled and the liquid sulphur dioxide lower layer removed. The upper layer, consisting essentially of the volatile organic compound, is returned to the column as reflux.

When operating according to the procedure last described the preferred organic compound for use in the process of the invention is normal pentane. Other suitable compounds are paraffins of 3–7 carbon atoms per molecule and ethers such as dimethyl ether and diethyl ether.

The residue or bottoms product obtained on distillation according to any of the methods described above, in general, is treated with an alkaline material preferably caustic soda in aqueous solution, if necessary at low temperature to avoid boiling-off the volatile organic compound. The neutralised product is subjected to distillation, preferably under reduced pressure, to take off water and the remainder of the volatile organic compound overhead. The residual neutralised sulphonate is recovered as a gel and may be dried to a powder, for example by steam heating in air.

The added organic compound is preferably also water-insoluble. In this case the overhead product in the second distillation stage on condensation and settling yields two layers. The layer of added organic compound may be dried and recycled.

When normal pentane is employed as the volatile organic compound according to the invention, the final distillation, for the removal of water and pentane, may be carried out in two stages, the pentane removed in the first stage being returned after drying to the primary distillation stage in which sulphur dioxide is taken overhead.

If desired a small proportion of the neutralised sulphonic acid may be recycled to the crude sulphonic acid prior to the first distillation stage as described in the co-pending British application No. 5,208/49. When operating in this manner higher distillation temperatures may be tolerated than in the absence of this material. The recycled neutralised sulphonic acid may be added to the crude sulphonic acid solution as a solution in the added hydrocarbon.

Preferred sulphonated aromatic compounds for use in the process of the invention are the products of sulphonating long chain alkyl aromatic hydrocarbons, such as the products of alkylating benzene or toluene with propene polymers or butene polymers of 9–16 carbon atoms.

Other sulphonated aromatic compounds suitable for use in this process are the products of the sulphonation of gas oil under conditions leading only or principally to the reaction of the aromatic constituents.

The process of the invention is particularly described with reference to the accompanying diagram, which illustrates a sulphonation stage and subsequent product recovery stage.

An aromatic feedstock is fed to the dilution vessel 1 where it is mixed with liquid sulphur dioxide the main part of which is recovered from the distillate from still 6. Make up sulphur dioxide to replace the small process losses is added at this point. This diluted alkylate is fed to the sulphonator 2 (fitted with agitator) together with the main sulphur dioxide recycle stream withdrawn from the separator 4. Sulphur trioxide is added dissolved in the sulphur dioxide in the reflux stream from the reflux condenser 3. Sulphur dioxide is vapourised by the heat of the sulphonation reactor, and the vapours are condensed by the reflux cooler 3 and the liquid sulphur dioxide returned to the sulphonation reactor 2. The sulphonated product is withdrawn into the separator 4, and the lower sulphur dioxide layer taken off and returned to the reactor 2. The sulphonic acid layer is withdrawn from this separator to the stirred vessel 5, where pentane is added and mixed. The mixture is then passed to the still 6, where sulphur dioxide is removed as its azeotrope with pentane, this distillate mixture being condensed, when it separates into two layers in the vessel 10. The $SO_2$ layer is removed and returned to the dilution vessel 1 with any necessary make up $SO_2$. The pentane upper layer is returned to the column 6 as reflux. The bottoms from the still 6, comprising a mixture of pentane and sulphonic acid is neutralised by mixing with caustic soda solution. The neutralised material passes to the evaporator 8, where the pentane and some of the water is taken overhead and allowed to separate in 11. The condensed water and pentane are allowed to separate and the pentane layer withdrawn, dried, and returned to the vessel 5, together with the small amount of pentane make-up required to replace process losses. The residual material from the evaporator (usually a slurry) is then passed to the drier 9, where the remaining water is removed. The dried product, is recovered as a white solid from 9.

Our invention is illustrated but in no way limited by the following examples.

*Example 1*

This example illustrates the operation of the process of the invention with addition of the added organic compound to the liquid feed to the distillation stage.

43 grams of freshly distilled monomeric sulphur trioxide was dissolved in 400 grams of liquid sulphur dioxide and added with stirring to 130 grams (½ mole) of the alkylate of toluene with propylene tetramer dissolved in 135 grams of liquid $SO_2$. The sulphonation temperature was maintained at −8° C. by refluxing the sulphur dioxide solvent. The sulphur dioxide was boiled from the mixture by the heat of the sulphonation reaction, and the cooling available to return this sulphur dioxide as reflux determined the rate at which sulphur trioxide was added; the sulphonation reaction was extremely rapid. After completion of the reaction the mixture was cooled to −20° C., allowed to separate into two layers and the lower sulphur dioxide layer which separated was withdrawn for re-use.

The upper layer remaining was diluted with 200 ml. of methylcyclohexane and, after agitating thoroughly, passed through a climbing film evaporator maintained at 0° C. by operating at a pressure of 20–25 mm. the sulphur dioxide being thereby removed. The sulphonic acid-methylcyclohexane mixture remaining was run into aqueous (normal) caustic soda and neutralised. The soda concentration was fixed to give a concentration of sodium sulphonate conveniently handled in the next stage and is not regarded as critical.

The sodium sulphonate-methylcyclohexane-water mixture after neutralisation was passed through a second climbing film evaporator, and the water and methylcyclohexane taken off as distillate. This separated into two layers on condensing and the methylcyclohexane layer was separated, dried, and used again. The residual sodium sulphonate was recovered as a gel which was dried to a powder by steam heating in air. This final product was practically colourless and free of odour.

*Example 2*

This example illustrates the operation of the process of the invention particularly described with reference to the accompanying diagram, i. e. wherein the added organic compound is employed as reflux within the primary distillation zone 6.

The aromatic compound sulphonated was an alkylate of toluene with propylene tetramer and the added organic compound was normal pentane.

Quantites of materials employed were as follows; parts being by weight:

| | Parts |
|---|---|
| Aromatic compound | 1.01 |
| Liquid sulphur dioxide fed to dilution vessel 1 | 1.03 |
| Sulphur trioxide | 0.338 |
| Pentane to vessel 5 | 1.00 |
| Sulphur dioxide layer returned to reactor 2 | 2.815 |

Caustic soda solution: 0.187 part of NaOH dissolved in 4.67 parts of water.

The dried product consisted of 1.455 parts of the sodium sulphonate and 0.105 part of sodium sulphate.

We claim:

1. A process for the separation of sulphur dioxide from a sulphonic acid obtained by reacting an aromatic compound with a compound selected from the group consisting of oleum and sulfur trioxide, in the presence of liquid sulphur dioxide as solvent, which comprises adding to the sulphonic acid solution, a volatile saturated organic compound selected from the group consisting of paraffin hydrocarbons having from 3 to 8 carbon atoms per molecule, naphthenes having from 5 to 8 carbon atoms per molecule, aliphatic ethers having from 2 to 4 carbon atoms per molecule, cyclic ethers, chloroform, ethylene dichloride, carbon tetrachloride and methylene dichloride, chemically inert under the distillation conditions, and which is a mobile liquid at −10° C., and distilling the mixture at sub-atmospheric pressure to take overhead substantially all of the liquid sulphur dioxide and at least some of the added organic compound.

2. A process as specified in claim 1 in which the distillation is carried out at a temperature up to 0° C.

3. A process as specified in claim 1 in which the added organic compound is of low solubility in liquid sulphur dioxide.

4. A process as specified in claim 1 in which the added organic compound is mixed with the feed to the distillation.

5. A process as specified in claim 1 in which the added organic compound forms a minimum constant boiling mixture with sulphur dioxide.

6. A process as specified in claim 4 in which the distillation is carried out batchwise and in which the feed is diluted with 2–3 volumes of the added organic compound.

7. A process as specified in claim 1 in which the volatile organic compound is admixed with the solution during distillation.

8. A process as specified in claim 7 in which the paraffin is normal pentane.

9. A process as specified in claim 7 in which the added organic compound is substantially water-insoluble and in which the overhead product of the second distillation is separated into an aqueous layer and an organic layer, the organic layer being recycled to the first distillation stage.

References Cited in the file of this patent

UNITED STATES PATENTS

| Re. 22,548 | Brandt | Sept. 26, 1944 |
| 2,268,443 | Crowder | Dec. 30, 1941 |
| 2,325,320 | Holuba | July 27, 1943 |
| 2,358,774 | Blumer | Sept. 26, 1944 |

FOREIGN PATENTS

| 567,938 | Great Britain | Mar. 9, 1950 |

OTHER REFERENCES

Handbook of Chem., by Lange (6th ed.) (1946), pp. 1367–9.